United States Patent [19]
Wolfe

[11] Patent Number: 5,312,467
[45] Date of Patent: May 17, 1994

[54] AIR FILTER ASSEMBLY

[76] Inventor: Michael Wolfe, 101 W. 90th St., New York, N.Y. 10024

[21] Appl. No.: 965,764

[22] Filed: Oct. 23, 1992

[51] Int. Cl.$^5$ .................. B01D 46/10; B01D 53/04
[52] U.S. Cl. .......................... 55/493; 55/496; 55/527; 55/528; 55/523; 95/901
[58] Field of Search ............... 55/387, 483, 493, 496, 55/523, 527, 528, 487, 269

[56] References Cited

U.S. PATENT DOCUMENTS

| | | | |
|---|---|---|---|
| 570,219 | 10/1896 | Fiechter. | |
| 1,056,722 | 3/1913 | Adler. | |
| 2,478,097 | 8/1949 | Glanzer | 183/74 |
| 2,551,175 | 5/1951 | Smith | 210/204 |
| 2,615,477 | 10/1952 | Crawley | 139/426 |
| 3,675,402 | 7/1972 | Weed | 55/496 |
| 4,022,596 | 5/1977 | Pedersen | 55/528 |
| 4,225,642 | 9/1980 | Hirakawa | 55/528 X |
| 4,728,349 | 3/1988 | Oshitari | 55/487 |
| 4,801,383 | 1/1989 | Hoffmann et al. | 55/487 X |
| 4,824,451 | 4/1989 | Vogt et al. | 55/528 |
| 4,904,288 | 2/1990 | d'Augereau | 55/485 |
| 5,004,487 | 4/1991 | Kowalczyk | 55/269 |
| 5,037,455 | 8/1991 | Scheineson et al. | 55/528 X |

FOREIGN PATENT DOCUMENTS 2622814 12/1977 Fed. Rep. of Germany ........ 55/527

*Primary Examiner*—Charles Hart
*Attorney, Agent, or Firm*—Bryan Cave

[57] ABSTRACT

A window air filtering assembly for repulsive filtering of pollen, dirt and small particulate matter. The air filtering assembly includes a frame assembly and a filtering medium disposed in the frame assembly. The filtering medium is formed from woven, smooth-surfaced microfilament strands having at least 16% of its surface area open.

9 Claims, 1 Drawing Sheet

AIR FILTER ASSEMBLY

BACKGROUND OF THE INVENTION

The present invention generally relates to air filters. More particularly, this invention relates to non-mechanical filtering of small size particulate matter in air.

Air filtering systems to remove deleterious particulate matter are important for general health and particularly important for persons having allergies, asthmatic conditions and the like. Building air ventilation systems generally include air filtering means that requires the use of mechanical blowers and other large equipment. Air filter systems specifically designed to remove small size particulate matter also generally employ some type of mechanical air-moving equipment. Conventional window screens are generally limited to preventing the entry of insects and the like and therefore are not useful for filtering small particulate matter.

Various non-mechanical air filtering means have been proposed in the prior art. Such air filtering means generally function by capturing or collecting the particulate matter on or in a screening media. This results in a requirement that the filter be periodically cleaned or replaced. Where the air is heavily contaminated with particulate matter, such air filters must be cleaned or replaced quite often. U.S. Pat. No. 570,219 to Fletcher illustrates an air filtering systems of this type. In the Fletcher patent a filtering material is disclosed wherein warp-threads are interwoven to form closely-woven selvages. Dust or fine particles collect on the selvages and air passes between them. U.S. Pat. No. 1,056,722 to Adler discloses a dust-collecting screen consisting of a fabric formed from strands of coarse and linty textile adapted to be saturated with a non-evaporating liquid such as oil. The moistened linty textile collects small size particulate matter and air passes through the openings between the coarse and linty strands. In U.S. Pat. No. 2,478,097 to Glanzer a woven-screen air filter is shown having cloth-covered wire threads. The cloth covering for the wire threads collect particulate matter and may be saturated with a liquid to facilitate collection of dust and the like. U.S. Pat. No. 2,551,175 to Smith discloses a filter cloth formed from strands so tightly woven that filterable material will not pass through the inter-filament spaces of the woven strands and thereby limits air passage to the spaces between adjacent strands. U.S. Pat. No. 2,615,477 to Crawley discloses an air filtering media comprising woven fabrics formed entirely of yarns formed from continuous filaments of a vinyl resin and discontinuous filaments of a vinyl resin, the respective filaments alternating in a regular pattern throughout the fabric. U.S. Pat. No. 4,728,349 to Oshitari discloses a composite air filter medium comprising a glass fiber layer of desired dust-collecting efficiency and a supporting fiber layer of low dust-collecting efficiency. In U.S. Pat. No. 4,904,288 to d'Augereau a reusable air filter assembly is disclosed comprising a composite structure including an outlet stage filter medium consisting of two fabric layers woven in an egg-crate pattern.

The present Applicant has discovered that an air filter having at least 16% of the surface area open provides suitable natural ventilation. This structural limitation can be utilized to construct an air filter having openings sufficiently small to prevent the passage of small size particulate matter without collection or adhesion of the particulate matter in or onto the filter media while simultaneously permitting sufficient air flow for natural ventilation. It is further useful if an air filter medium having this characteristic can be provided in a structure that can be selectively disposed in a window frame or other opening.

SUMMARY OF THE INVENTION

The present invention is a portable window air filter assembly generally comprising a frame assembly and a woven filtering medium fixedly disposed in the frame assembly. The filtering medium is formed from smooth-surfaced microfilament strands having a diameter of at most 30 microns which are spaced apart at most 20 microns. This construction restricts entry of most dirt and pollen. To allow suitable natural ventilation, i.e. ventilation that does not require the use of mechanical blowers, the open area of the filtering medium is at least 16% of it surface area. In a preferred embodiment of the window air filter assembly of the present invention the frame assembly comprises first and second frame members attached in cooperable and slidable engagement. A first filtering medium anchor is fixedly attached to the first frame member, and a second filtering medium anchor is rotatably attached to the second frame member. Respective ends of the filtering medium are respectively attached to the first and second anchors.

An object of the present invention is to provide air filtering means that prevents the passage of small size particulate matter without collecting the particulate matter in or upon the filtering medium.

Another object of this invention is to provide air filtering means that can be easily transported from one window or like opening to another.

Another object of this invention is to provide air filtering means that permits natural ventilation, i.e. air flow under low differential pressures.

It is also an object of the present invention to provide an air filter system that is self-cleaning and thereby eliminates or substantially reduces the need for short term replacement or cleaning.

These and other objects and advantages of the present invention will be better understood by those skilled in the art from the following description of a preferred embodiment, claims and appended drawings.

DESCRIPTION OF A PREFERRED EMBODIMENT

Figure 1:
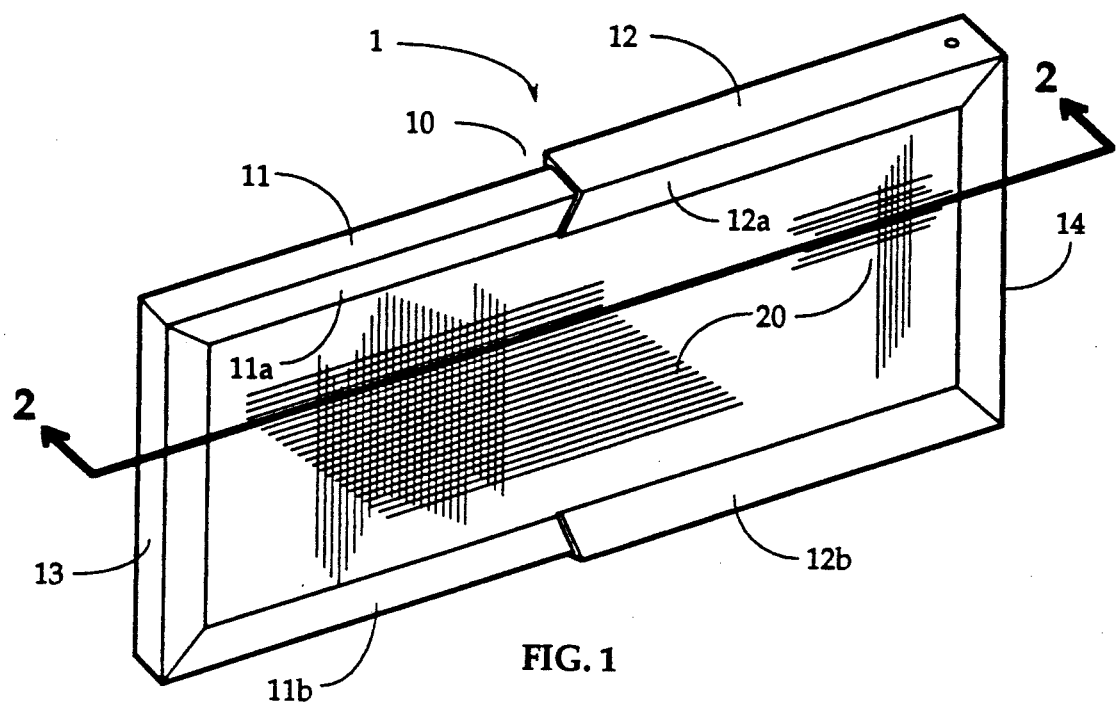
FIG. 1 is a front perspective view of window air filter assembly constructed in accordance with the teachings of the present invention.
Figure 2:
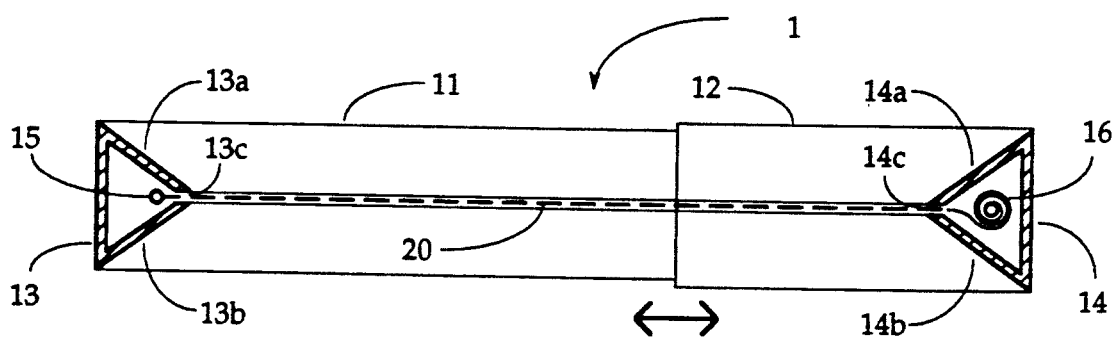
FIG. 2 is a cross-sectional view of the window air filter assembly taken along line 2—2 of FIG. 1.

FIG. 1 illustrates in a front perspective view a preferred embodiment of the window air filter assembly 1 of the present invention. Air filter assembly 1 generally comprises a laterally-adjustable frame assembly 10 and a woven filtering medium 20 fixedly disposed in frame assembly 10. In the preferred embodiment of air filter assembly 1, frame assembly 10 includes a first frame member 11 and a second frame member 12 cooperably and slidably engageable. The first and second frame members 11, 12 are formed having a substantially C- shaped configuration. The respective second horizontal legs 12a, 12b of second frame member 12 slidably engage the respective first horizontal legs 11a, 11b of first frame member 11. As can be seen in the cross-sectional view of the air filter assembly 1 illustrated in FIG. 2 a vertically-extending first filtering medium support channel 13 is fixedly attached perpendicularly to the first frame member 11 and a vertically-extending second filtering medium support channel 14 is fixedly attached perpendicularly to the second frame member 12. The respective first and second filtering medium support channels 13, 14 have a substantially C-shaped cross-section with the respective horizontal legs 13a, 13b and 14a, 14b extending angularly inward toward each other. Respective first and second support channel slots 13c and 14c are formed by the marginally-displaced ends of the respective horizontal legs 13a, 13b and 14a, 14b of the respective first and second support channels 13, 14. A first filtering medium anchor 15 is centrally disposed and fixedly attached in an interior portion of first filtering medium support channel 13 and a second filtering medium anchor 16 is eccentrically disposed in an interior portion of second filtering medium support channel 14. Second filtering medium anchor 16 is rotatably attached to second frame member 12 and is spring-biased for lateral rotation. Respective ends of filtering medium 20 are fixedly attached to the respective first and second filtering medium anchors 15, 16.

Frame assembly 10 is preferably formed from a waterproof material. The slidable attachment of first frame member 11 and second frame member 12 permits lateral adjustment of frame assembly 10 to fit the air filter assembly 1 in variously-sized windows or other openings. The spring-biased second filtering medium anchor 16 rolls up filtering medium 20 as the frame assembly 10 is narrowed.

Filtering medium 20 is preferably formed from woven smooth-surfaced microfilament strands 21, 22, for example, polyester, nylon, polypropylene, carbon, fiberglass, ceramic or metal strands. The microfilaments may or may not be electrostatically treated. The filtering medium 20 of the present invention is provided to prevent the passage of microscopic particles through the spaces between strands 21, 22. Tightly woven filter cloths as shown in the prior art are limited to use with mechanical blowers and the like. To provide a fine mesh filtering medium that permits natural ventilation, that is, air flow under small differential pressures without the aid of forced-air blowers, the Applicant has discovered that at least 16% of the surface area of the filtering medium must be open.

Figure 3:
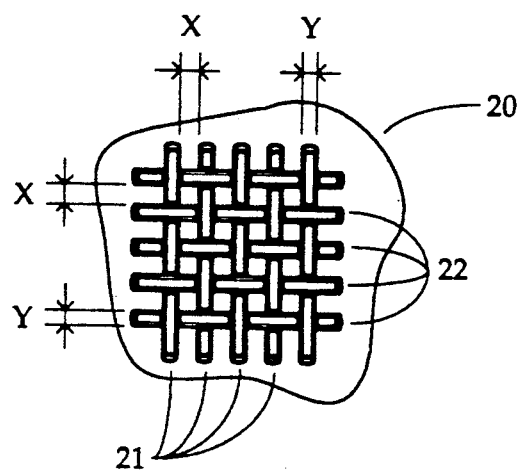
FIG. 3 is an enlarged fragmentary section of the woven filtering medium of the present invention.

Allergenic pollens are generally larger than 15 microns in diameter. For example, pollen from Ambrosia (ragweed) is oblate-spheroid in shape and it size ranges between 22–29 microns by 22–32 microns. Pollens from the Asteraceae family (herbs and weeds) range between 15–48 microns by 16–40 microns. The many pollens of the Poaceae family (grasses) have a generally spheroid shape ranging in size from 22–122 microns. For example, Lolium (Rye grass) pollen ranges between 32–45 microns. The tree family pollens include, for examples, Betula (birch) pollen ranging in size from 18–23 micron by 21–30 microns, Alnus (alder) pollen ranging from 19–21 microns by 23–30 microns, Olea (olive) pollen ranging from 22–31 microns by 22–28 microns and Quercus (oak) pollen ranging from 22–36 microns by 19–39 microns. From the foregoing, it should therefore be understood that a filtering medium 20 having microfilament strands 21, 22 spaced apart at approximately 15 microns will prevent the passage therethrough of most air-borne pollens. In FIG. 3 the spacing of microfilament strands 21, 22 of filtering medium 20 is represented by the letter "X".

As previously mentioned, Applicant has determined that natural ventilation through filtering medium 20 can be accomplished when at least 16% of its surface area is open. It is not certain whether this is a result of air viscosity or mechanical interference in moving air. However, for a suitable air exchange to maintain air freshness and breathability, and to remove dampness and phenols escaping drapes, furniture, etc. at least 16% of the surface area must be open. Therefore, in a woven filtering medium 20 having the microfilament strands 21, 22 spaced apart at 15 microns, the strands 21, 22 must be at most 22 microns in diameter. A filtering medium 20 having strands 21, 22 more closely spaced, for example strands spaced 7 microns apart, would require the use of microfilament strands 21, 22 having a smaller diameter, for the present example, 10 microns. Presently, the minimum size strands commercially available is 30 microns. For a filtering medium 20 meeting the requirements of the present invention, 30 micron-strands must be spaced at least 20 microns apart. A filtering medium 20 so constructed would still prevent passage of a large portion of the pollen heretofore noted. The diameter of the microfilament strands 21, 22 are represented in FIG. 3 by the letter "Y".

The microfilament strands 21, 22 of the filtering medium 20 are preferably formed having a smooth outer surface to prevent entanglement of pollen, dirt and the like in the individual strands 21, 22. The repulsive filtering of the present invention extends the useful life of filtering medium 20 between cleanings. Since air impinges filtering medium 20 at a variety of angular orientations, the impinging air facilitates self-cleaning of filtering medium 20. Particulate matter that may become lodged in filtering medium 20 is periodically dislodged by the action of non-perpendicular air flow through filtering medium 20.

Various changes, additions and modifications may be made to the present invention without departing from its spirit and scope. Such changes, additions and modifications within a fair reading of the appending claims are intended as part of the present disclosure.

Therefore, in view of the foregoing I claim:

1. An air filter asssembly comprising:
   a frame assembly; and
   a woven filtering medium comprising woven microfilament strands of a diameter of at most 30 microns, said strands being spaced apart by at most 20 microns, and filtering medium disposed in the frame assembly, said filtering medium having at least 16% of its surface area open;
   wherein said filtering medium is non-entraining and reduces the passage of pollen and dust particles through said air filter, while allowing the free passage of air through said air filter.

2. A window air filter assembly as in claim 1 wherein said filtering medium comprises microfilament strands having a diameter of 15 microns, said strands being spaced apart at 15 microns.

3. A window air filter assembly as in claim 1 wherein said filtering medium comprises microfilament strands having a diameter of 10 microns, said strands being spaced apart at 7 microns.

4. A window air filter assembly as in claim 1 wherein said filtering medium comprises microfilament strands having a diameter of 30 microns, said strands being spaced apart at 20 microns.

5. An air filter assembly for repulsive filtering of particulate matter, said air filter comprising:
   a laterally-adjustable frame assembly; and
   a laterally-adjustable woven filtering medium attached to said frame assembly, said filtering medium having at least 16% of its surface area open and comprising woven, smooth-surfaced microfilament strands, said strands having a diameter of at most 30 microns, and being spaced apart at most 20 microns.

6. A window air filter assembly as in claim 5 wherein said frame assembly comprises a first frame member and a second frame member, said first and second frame members being attached in cooperable and slidable engagement, a first filtering medium anchor being fixedly attached to the first frame member and a second filtering medium anchor being rotatably attached to the second frame member, said filtering medium being attached at respective ends thereof to said first anchor and to said second anchor.

7. A window air filter assembly as in claim 5 wherein said microfilament strands have a diameter of 15 microns, said strands being spaced apart 15 microns.

8. A window air filter assembly as in claim 5 wherein said microfilament strands have a diameter of 10 microns, said strands being, spaced apart 7 microns.

9. A window air filter assembly as in claim 5 wherein said microfilament strands have a diameter of 30 microns, said strands being spaced apart 20 microns.

* * * * *

UNITED STATES PATENT AND TRADEMARK OFFICE
CERTIFICATE OF CORRECTION

PATENT NO. : 5,312,467

DATED : May 17, 1994

INVENTOR(S): Michael Wolfe

It is certified that error appears in the above-identified patent and that said Letters Patent is hereby corrected as shown below:

Column 4, line 54,
                Delete "and" and insert --said--.

Signed and Sealed this

Sixth Day of September, 1994

Attest:

BRUCE LEHMAN

Attesting Officer      Commissioner of Patents and Trademarks